United States Patent
Ödling et al.

(10) Patent No.: US 11,016,014 B2
(45) Date of Patent: May 25, 2021

(54) METHOD OF OPTIMIZING FILTER LIFE CYCLE BETWEEN REPLACEMENTS AND SYSTEM FOR MONITORING A VENTILATION SYSTEM

(71) Applicant: Dinair AB, Vadstena (SE)

(72) Inventors: Patrik Ödling, Vadstena (SE); Johannes Ullström, Norrköping (SE)

(73) Assignee: Dinair AB, Vadstena (SE)

( * ) Notice: Subject to any disclaimer, the term of this patent is extended or adjusted under 35 U.S.C. 154(b) by 380 days.

(21) Appl. No.: 16/090,441

(22) PCT Filed: Mar. 24, 2017

(86) PCT No.: PCT/EP2017/057113
§ 371 (c)(1),
(2) Date: Oct. 1, 2018

(87) PCT Pub. No.: WO2017/167666
PCT Pub. Date: Oct. 5, 2017

(65) Prior Publication Data
US 2019/0120744 A1  Apr. 25, 2019

(30) Foreign Application Priority Data
Apr. 1, 2016 (SE) .................................. 1650443-3

(51) Int. Cl.
*G05B 23/02* (2006.01)
*F24F 11/00* (2018.01)
(Continued)

(52) U.S. Cl.
CPC ..... *G01N 15/0826* (2013.01); *B01D 46/0086* (2013.01); *G05B 19/0428* (2013.01);
(Continued)

(58) Field of Classification Search
USPC .......................................................... 702/34
See application file for complete search history.

(56) References Cited

U.S. PATENT DOCUMENTS

| | | |
|---|---|---|
| 5,036,698 A | 8/1991 | Conti |
| 6,035,851 A | 3/2000 | Wallen |
(Continued)

FOREIGN PATENT DOCUMENTS

| | | |
|---|---|---|
| FR | 2770788 A1 | 5/1999 |
| JP | 2011191017 A | 9/2011 |
| SE | 537506 C2 | 5/2015 |

OTHER PUBLICATIONS

International Preliminary Report on Patentability and Written Opinion issued in PCT Application No. PCT/EP2017/057113 dated Oct. 2, 2018 (seven (7) pages).
(Continued)

*Primary Examiner* — Leslie J Evanisko
(74) *Attorney, Agent, or Firm* — Olive Law Group, PLLC

(57) ABSTRACT

The present disclosure provides a method of determining an optimal filter life cycle between replacements of a filter in a ventilation system. The method comprising performing the following steps in a processing device: receiving at least one filter hardware value, receiving at least one filter use value, receiving a plurality of measured data points, and determining the optimal filter life cycle by minimizing a total filter resource consumption composed of a first factor, a second factor, providing a plurality of predicted data points, grouping successive measured data points into windows, and assigning the identified maximum pressure drop as a maximum pressure drop for all measured data points of that window.

20 Claims, 3 Drawing Sheets

(51) Int. Cl.
*B01D 35/143* (2006.01)
*G01N 15/08* (2006.01)
*B01D 46/00* (2006.01)
*G05B 19/042* (2006.01)

(52) U.S. Cl.
CPC ...... *G05B 23/0283* (2013.01); *B01D 2279/50* (2013.01); *G01N 2015/084* (2013.01); *G05B 2219/2614* (2013.01)

(56) References Cited

U.S. PATENT DOCUMENTS

| | | | |
|---|---|---|---|
| 7,922,914 | B1* | 4/2011 | Verdegan ............ B01D 46/446 210/741 |
| 10,207,213 | B2* | 2/2019 | Soldi .................. B01D 46/0086 |
| 2005/0247194 | A1 | 11/2005 | Kang et al. |
| 2007/0146148 | A1 | 6/2007 | Kawasaki et al. |
| 2008/0014853 | A1 | 1/2008 | Kim |
| 2015/0059492 | A1 | 3/2015 | Rausio et al. |
| 2019/0073619 | A1* | 3/2019 | Allegorico ............ G01M 15/14 |

OTHER PUBLICATIONS

Russian Search Report, dated Dec. 17, 2019.
International Search Report and Written Opinion issued in related PCT Application No. PCT/EP2017/057113 dated Jun. 1, 2017 (thirteen (13) pages).
Office Action for corresponding Chinese Patent Application 201780025284.1.
Summary of Office Action for corresponding Chinese Patent Application 201780025284.1.

* cited by examiner

METHOD OF OPTIMIZING FILTER LIFE CYCLE BETWEEN REPLACEMENTS AND SYSTEM FOR MONITORING A VENTILATION SYSTEM

CROSS REFERENCE TO RELATED APPLICATIONS

This application is a 35 USC 371 application of International PCT Patent Application No. PCT/EP2017/057113, filed on Mar. 24, 2017, which claims priority to Swedish Patent Application No. 1650443-3, filed on Apr. 1, 2016; the contents of which are hereby incorporated by reference herein in their entireties.

TECHNICAL FIELD

The invention relates to a method and system for optimizing filter life cycle between filter replacements in ventilation systems.

The invention provides a method for improving the overall filter cost and/or carbon dioxide impact of ventilation systems.

The invention is also applicable to systems for separating particles from a stream of particle-laden air.

BACKGROUND

Ventilation systems used in buildings, ships or other major structures typically comprise ventilation ducts and a fan arranged to drive air through the ventilation ducts. However, many systems also comprise further components, such as heat exchangers and moisture exchangers, operating to provide a desired indoor climate.

In order to reduce exposure to particles, both for users and for the ventilation system components, the system normally comprises one or more filters, arranged to filter incoming and/or outgoing air.

Such filters are typically consumables and need to be replaced at certain intervals. As there is a cost associated with the filter itself, and with the labour required to exchange it, there is a general motivation to replace filters as seldom as possible, and preferably only at the very end of their technical service life.

Moreover, as a filter is being used, it gradually fills up with particles which have been separated from the air being filtered. As the filter fills up, it will provide greater resistance to air flowing through it, thus requiring the fan to work harder. As the fan works harder, its energy consumption will increase. Hence, there is also a motivation to replace filters as often as possible, in order to minimize energy consumption.

Various methods for monitoring filter status are disclosed in FR2770788A, US2005247194A, US2008014853A, JP2011191017A, U.S. Pat. No. 6,035,851A, US2007146148A and U.S. Pat. No. 5,036,698A. However, these methods are directed at predicting the filter's technical service life, i.e. for how long the filter will work good enough. They fail to consider the fact that while a filter works good enough, i.e. provides a good enough filtration and low enough pressure drop, the actual total resource consumption would actually be decreased by replacing the filter well before the end of its technical service life.

The present disclosure is an improvement of the method and system disclosed in SE537506C2, which works well.

FIG. 5 is an illustrative example of measured pressure drop over a three-week period. From FIG. 5, it is recognized that the pressure drop varies abruptly, which is due to the fact that the fan is operating as "demand controlled ventilation" or "DCV". That is, the fan only operates when needed, which is a strategy for saving energy, as opposed to older ventilation systems, where the fan would operate continuously or during predetermined time intervals. Hence, the fan may only operate, e.g. when there are people or any type of activity going on in the ventilated facility.

However, such DCV has an impact on the optimization of the filter life cycle. Preferably, it would be desirable to measure both pressure drop and airflow in order to properly estimate the optimal filter life cycle.

There is a need for an even further improved method of optimizing the time period between filter replacements in order to achieve an overall improved resource utilization.

SUMMARY

It is an object of the present disclosure to provide a method and system for optimizing filter life cycle between replacements in ventilation systems.

The invention is defined by the appended independent claims, with embodiments being set forth in the appended dependent claims, in the following description and in the drawings.

According to a first aspect, there is provided a method of determining an optimal filter life cycle between replacements of a filter in a ventilation system. The method comprising performing the following steps in a processing device: receiving at least one filter hardware value, representing an amount of a resource associated with at least production of the filter, receiving at least one filter use value, representing an amount or rate of said resource associated with use of the filter, receiving a plurality of measured data points, each representing a measured pressure drop over the filter at a respective time, and determining the optimal filter life cycle by minimizing a total filter resource consumption composed of a first factor, according to which the resource consumption is inversely proportional to the filter life cycle, a second factor, according to which the resource consumption is directly proportional to the filter life cycle, providing a plurality of predicted data points, each representing an predicted pressure drop over the filter at a respective future point in time, grouping successive measured data points into windows, each window comprising at least one of the measured data points, for each window identifying a maximum pressure drop, and assigning the identified maximum pressure drop as a maximum pressure drop for all measured data points of that window; for each measured data point estimating an air flow based on the maximum pressure drop and the measured pressure drop of the respective measured data point, and deriving the second factor based on the filter use value, the measured data points, the predicted data points and the estimated air flows.

The term "filter" should be construed as the assembly which is actually being replaced, and may thus include only the filter medium, or the filter medium and a frame on which the filter medium is mounted. Moreover, the term "filter" may comprise both a single filter unit and a filter assembly of two or more individual filters which are connected in series and/or in parallel.

The "filter hardware value" can be seen as the resource consumption associated with changing a filter, i.e. primarily the cost (or other resource consumption, such as $CO_2$ impact) of the filter itself, but it may also extend to costs such as the cost of transporting the filter from a distribution location to the filter use location, the cost for the operator performing the filter change, possibly also including any travel cost, and the costs for disposal of the used filter.

The "filter use value" can be seen as the consumption of the same resource as that of the filter hardware value, but associated with the actual use of the filter, i.e. primarily the cost (or other resource consumption, such as $CO_2$ impact) of energy used to drive air through the filter.

The "measured pressure drop over the filter" is a measurement of the pressure drop provided by the actual filter when it is in place of operation.

The present disclosure is thus based on the recognition that, while from a filter cost perspective, it is desirable to replace filters as seldom as possible, from a fan drive energy perspective; it may be desirable to replace filters more often.

In addition to the cost perspective, there is also the carbon dioxide perspective, since the production (and distribution) of the filter itself gives rise to some carbon dioxide impact on the environment, as does the energy used to drive the fan.

Hence, the present invention provides an improved method which enables planning of filter changes with a view to minimizing a resource consumption, such as cost or carbon dioxide impact.

In particular, the present invention eliminates the need for a separate airflow meter in a DCV system, and thus makes it possible to estimate airflow based on the pressure drop measurements. This estimated airflow is then used as a basis for estimating the filter life cycle.

In the method, providing a plurality of predicted data points may comprise calculating a respective predicted pressure drop through the formula $P(t)=start_{Pa}*e^{b*t}$, wherein $start_{Pa}$ is a starting pressure drop of the prediction, selected from the measured pressure drops of the measured data points, b is an environmental coefficient and t is the time from the time when the starting pressure drop $start_{Pa}$ is measured until the point in time for which the pressure drop is predicted.

In particular, the starting pressure drop $start_{Pa}$ may be a value derived based on the measured pressure drop of the latest available measured data point.

The starting pressure drop $start_{Pa}$ may also be a value derived based on the maximum pressure drop of the latest available measured data point or the latest available window.

In the method, each window may comprise at least two, preferably at least three or four, measured data points.

In practice, each window may comprise all measured data points of a predetermined time period, such as an hour, a day (24 hours), a week, a month, etc.

The windows may comprise a predetermined or dynamic number of measured data points.

The windows may comprise a maximum number of measured data points, e.g., data points measured in 24 hours.

The maximum pressure drop for each window may be determined with regard to an average value of the measure pressure drops of at least some of the measured data points of the window.

For example, the maximum pressure drop may be determined as the maximum pressure drop of all or part of the measure pressure drops of the window unless this maximum pressure drop diverges from the average pressure drop by more than a predetermined factor, such as 30%, 50%, 70% or 100% of the average pressure drop.

With the predetermined factor, the spikes, the noises and other unwanted measured pressure drops are removed to achieve a more accurate maximum pressure drop.

The maximum pressure drop for each window is determined with regard to a measured pressure drop and/or a maximum pressure drop of at least one preceding window.

For example, the maximum pressure drop may be set to a value that is at least as great as a maximum pressure drop and/or a maximum measured pressure drop of the immediately preceding window.

In the method, estimating the air flow for each measured data point may comprise deriving the estimated air flow of each measured data point based on a measured pressure drop of that measured data point and a characteristic function of the filter, wherein the characteristic function describes the air flow as a function of the pressure drop for the filter.

In the method, estimating the air flow for each measured data point may comprise providing a scaling factor based on the maximum pressure drop and the measured pressure drop of the measured data points, and using the scaling factor to adjust a characteristic function of the filter when it is clean.

The method may further comprise predicting the air flow for at least one, preferably some, of the predicted data points.

The predicted air flow of the predicted data points may be a fixed value derived based on the estimated air flows for at least some of the measured data points.

The predicted air flow of the predicted data points may also be a respective value derived based on at least one, preferably some, of the predicted data points.

According to the method, the current flow of each measure point may be estimated based on the measured pressure drop. Thus, the system is able to tell both the pressure drop and air flow through only one pressure drop measuring device, which reduces the cost of the system for monitoring a filter in a ventilation system.

In the method, the second factor may be derived based on the estimated air flow of each measured data point and/or the predicted air flow for the predicted data points.

The second factor may be calculated as a sum of resource consumptions of each interval between the measured data points.

In the method, the first factor may be determined as a product of the filter hardware value, an inverse of the time and optionally one or more constants.

The second factor may be determined as a sum of products of the filter use value, an air flow, a pressure drop, a time interval, an inverse of a fan efficiency, an inverse of a time, and optionally one or more constants.

The constants may include values aiming at providing the desired time scale. That is, the resulting values may be related to any time unit, such as seconds, minutes, hours, days or weeks.

The second factor may be determined according to the formula $$Energy_{annual\_cost}[i] = \sum_{k=0}^{i} E[k] * \frac{(8760*3600)}{M[i]_t} * Price_{kWh}$$

wherein $Price_{kWh}$ is the energy cost per kilowatt hour, $M[i]_t$ is the respective point in time and $$E[i] = \frac{CurrentQ * M[i]_p * (M[i+1]_t - M[i]_t)}{1000 * \eta}$$

$$i \leq pred_{start_{index}} \rightarrow CurrentQ = Q[i]$$

$$i > pred_{start_{index}} \rightarrow CurrentQ = \overline{Q}$$

wherein M[i]p is the pressure drop, M[i+1]$_t$–M[i]$_t$ is the time interval between measure data points M[i+1] and M[i], η is the fan efficiency, and CurrentQ is the estimated air flow (Q[i]) of the measured data point (M[i]) or the average of at least some of the estimated air flows (Q[i]).

The optimal life cycle may be determined by minimizing the formula $$Tot_{annual\_cost}[i] = Energy_{annual\_cost}[i] + Filter_{annual\_cost}[i]$$

with respect to the time M[i]$_t$.

According to a second aspect, there is provided a system for monitoring a filter in a ventilation system, comprising means for receiving a filter hardware value, representing an amount of a resource associated with at least production of the filter, means for receiving a filter use value, representing an amount of said resource associated with use of the filter, measurement means for measuring a pressure drop over the filter during use of the ventilation system, and processing means for determining an optimal filter life cycle according to the method as claimed in any one of the preceding claims.

DETAILED DESCRIPTION

Figure 1:
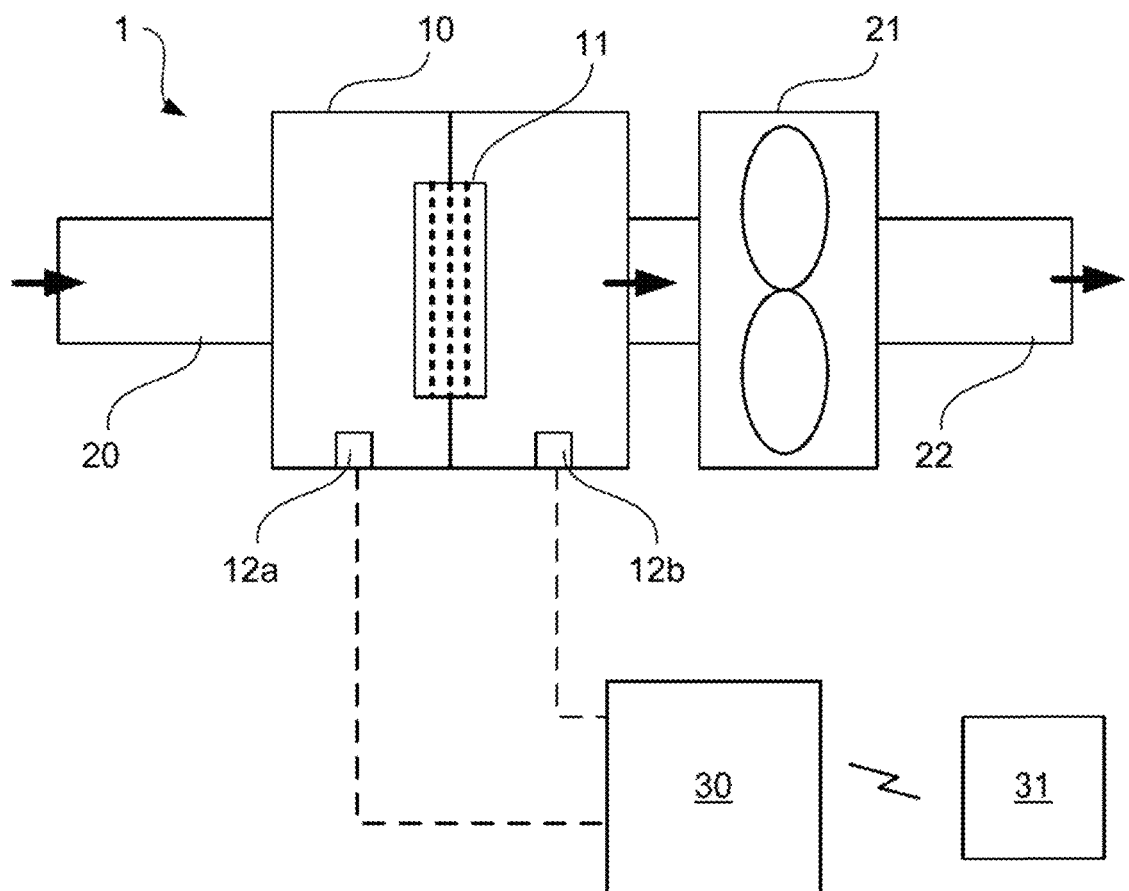
FIG. 1 schematically illustrates a ventilation system 1, to which the present disclosure is applicable.

FIG. 1 schematically illustrates a ventilation system 1, which can be used to provide air to/from the rooms of e.g. a building. The system 1 comprises ventilation ducts 20, 22, a fan 21 for driving air through the ventilation ducts and a filter module 10, adapted for receiving a replaceable filter cartridge 11. In the filter module 10, there is provided a measurement device 12a, 12b for measuring a pressure drop over the filter. For example the measurement device may comprise first and second pressure sensors 12a, 12b. The measurement device may be connected to a controller 30, which may be adapted for receiving measurement data from the pressure sensors 12a, 12b.

The controller 30 may be arranged to receive a respective pressure value from the sensors 12a, 12b and to calculate the pressure drop. As an alternative, the sensors may be arranged to directly measure the pressure drop, and thus to provide a single value to the controller 30.

The controller 30 may be arranged to read values from the sensors 12a, 12b continuously or at predetermined intervals and to store the received data in a memory. As an alternative, the controller 30 may be arranged to read values from the sensors only when being polled.

The controller 30 may be arranged to communicate with a remote unit 31, which may be a computer, a mobile terminal, etc.

In one embodiment, the controller 30 may be provided in the form of a dedicated unit having a sensor interface and a communications device, which may be arranged to communicate via e.g. a text messaging service ("SMS"—Short Message Service) or an e-mail through communication protocols, such as 2G, 3G, 4G, 5G, Bluetooth®, Wi-Fi, Zigbee, WLAN, etc. The unit may be arranged to send sensor data at predetermined intervals or only when polled. For example, the unit may be arranged to automatically reply to an incoming text message by sending the current sensor data. The unit thus need not have any memory at all, but merely the necessary interfaces and an a/d converter to convert the received sensor values into data for further processing and/or communication. In this embodiment, all data storage and processing may take place in the remote unit 31, possibly with a backup function being provided.

In another embodiment, a software may be provided for performing the methods disclosed herein, which is either in the form of a program stored on the controller, or in a computer which is communicatively connected with the controller, and which is accessible by the remote unit, e.g. via a web browser.

As another option, the software may be provided in the form of a downloadable application software (known as an "app"), which is downloaded to the remote unit. In one embodiment, the software is an application software which is configured to run on a mobile terminal, such as an iPhone®, or tablet-type PC, such as an iPad®, which is communicatively connected with the controller and which has a backup function provided either through a docking function with a host computer or through a cloud-based service (such as iCloud®).

In the following description, the following references will be used.

M—a list of measured pressure drop over time (t, p), sorted by time value.

P$_{max}$—max pressure drop

Price$_{kWh}$—Cost/kWh

Pricefilter—Total cost for a setup of filter including labour cost for the switch Q$_{max}$—Max flow that the HVAC unit runs at η—Fan efficiency M is grouped into timeframe windows of size MaxWindowTime. This is done to determine a running cycle. MaxWindowTime is set to 24 h but could be changed to better suit current filter installation. Here is one example of measured data points M[i] and windows W.

$$M = [[1, 49.1], [2, 50.3], [3, 48.7], \ldots [998, 99.1], [999, 98.2], [1000, 101.5]] \quad (equation\ 1)$$

$$W = [[[1, 49.1], [2, 50.3], [3, 48.7]], \ldots [[998, 99.1], [999, 98.2], [1000, 101.5]]] \quad (equation\ 2)$$

$$W[a][b] = \begin{cases} M\left[\left(\sum_{k=1}^{a} |W[k-1]|\right) + b\right], a > 1 \\ W[1][b] = M[b], a = 1 \end{cases} 1 < a < |W| \quad (equation\ 3)$$

For each M[i], a max value max_values[i] is determined, which is the value considered as max for that time. As described above, the measured values are grouped into windows. For each window, an analysis is done whether the window has a value which should be considered as a new max pressure drop. This is done by iterating the values of the window and comparing the values to the previous max. Another criteria that has to be met is that the max is not much higher than the mean pressure of current window. The mean value is only calculated for values in the window above the median value of the window. These criteria exist to avoid spikes and noise.

$$W[a]_{max} = \max(\{w[a][b] \mid w[a][b] \geq \overline{\{w[a][b] \mid w[a][b] \geq \widetilde{w[a]}\}}\} * AverageScale), 0 < b < |w[a]| \quad \text{(equation 4)}$$

AverageScale is set to 130%, but could be set to different values to either allow more or less difference in the max value.

$$\left. \begin{array}{l} \text{max\_values}[i] = W[a]_{max}, i = 1, W[a]_{max} > \text{max\_values}[i-1] * PreMaxScale \\ \text{max\_values}[i] = \text{max\_values}[i-1], W[a]_{max} \leq \text{max\_values}[i-1] \end{array} \right\} \quad \text{(equation 5)}$$

$$\left. \begin{array}{l} \left(\sum_{k=1}^{a}|W[k-1]|\right) < i < \left(\sum_{k=1}^{a}|W[k-1]|\right)+|w[a]|, a > 1 \\ 1 < i < |w[1]|, a = 1 \end{array} \right\} 1 < a < |W|$$

PreMaxScale is set to 60%, but could be set to different values to either allow more or less difference in the max value. The reason why the old max is scaled at all is to allow the max to decrease, since this is a common behavior for certain states of filter installation.

The identified max_values[i] are used for an exponential regression to predict future pressure drops. Only the most recent max_values are used instead of all the identified max_values. This is done to give more weight to most recent data, since it tells the most of how the pressure drops will develop. A dynamic number of max values can be used, but a good amount is about 14, which if the pressure drop keep rising in every window will correspond to 14 days.

The formula $p(t)=a*e^{b*t}$ obtained by the exponential regression is used to calculate future pressure drop, added to the parameter M, with steps of t=24 h. The provided parameter $P_{max}$ is used as a higher limit of calculated pressure drop. If the calculated value exceeds $P_{max}$, the value is set to $P_{max}$. This is done to avoid exorbitant pressure values.

It is common for filter manufacturers to measure the pressure drop at certain flow levels for a clean filter. This could be considered as the filters characteristic for pressure drop development.

The characteristic function is given by multiple linear regressions on a set of values for a clean filter. It could also be done using a polynomial, but to ensure 100% fit to the data, this method is chosen.

The flow values are given as a percentage of $Q_{nominal}$ (nominal flow for the filter, e.g. 3400 m3/h).

$$Q = \begin{bmatrix} q_1 \\ \vdots \\ q_n \end{bmatrix} \quad \text{(equation 6)}$$

$$P = \begin{bmatrix} p_1 \\ \vdots \\ p_n \end{bmatrix} \quad \text{(equation 7)}$$

$$P(q) = \begin{cases} k_j * q + m_j, Q_j < q < Q_{j+1} \\ k_n * q + m_n, q > Q_n \end{cases} \quad \text{(equation 8)}$$

$n = $ length of $Q = $ length of $P$ $$k_j = \frac{P_{j+1} - P_j}{Q_{j+1} - Q_j} \bigg\} 1 < j < n - 1 \quad \text{(equation 9)}$$

$$k_j = \frac{P_n - P_{n-1}}{Q_n - Q_{n-1}} \bigg\} j = n \quad \text{(equation 10)}$$

$$m_j = k * Q_j - P_j \quad \text{(equation 11)}$$

Figure 2:
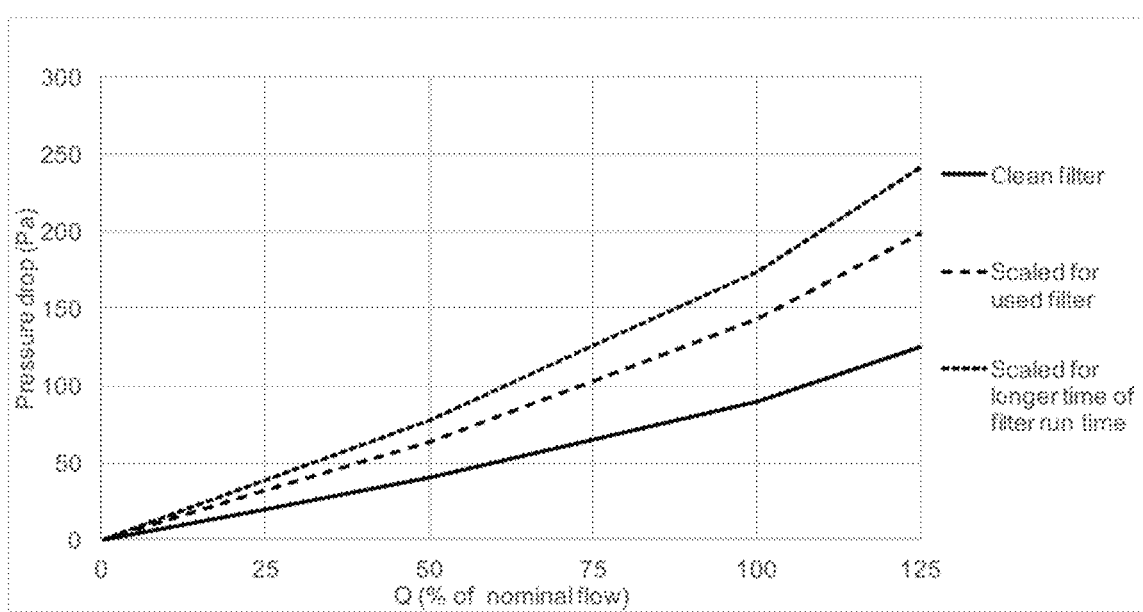
FIG. 2 is a plot of characteristic filter curves for a clean filter and the scaled characteristic curves for filters used to different extents.

FIG. 2 is a plot of characteristic filter curves for a clean filter and the scaled characteristic curves for filters used to different extents.

The values for the characteristic function is given for a clean filter, but the pressure values is then scaled so that the 100% flow value gives the value of the current value considered as max pressure drop.

$$\text{scale} = \frac{P(100)}{\text{max\_values}[i]} \quad \text{(equation 12)}$$

$$P_{scaled} = \text{scale} * P \quad \text{(equation 13)}$$

To determine the flow Q[i] of M[i], the measured pressure drop, M[i]p and max_values[i] is used together with the characteristic values.

To determine the flow Q[i], instead of looking at the pressure as a function of flow P(Q), the relationship of P and Q is inverted to look at flow as a function of pressure Q(p). It can be written as Q(M[i]p).

$$Q[i] = \begin{cases} k_j * M[i]_p + m_j, P_{scaled_j} < M[i]_p < P_{scaled_{j+1}} \\ k_n * M[i]_p + m_n, M[i]_p > P_{scaled_n} \end{cases} \quad \text{(equation 14)}$$

$n = $ length of $Q = $ length of $P_{scaled}$ $$k_j = \frac{Q_{j+1} - Q_j}{P_{scaled_{j+1}} - P_{scaled_j}} \bigg\} 1 < j < n - 1 \quad \text{(equation 15)}$$

$$k_j = \frac{Q_n - Q_{n-1}}{P_{scaled_n} - P_{scaled_{n-1}}} \bigg\} j = n \quad \text{(equation 16)}$$

$$m_j = k * P_{scaled_j} - Q_i \quad \text{(equation 17)}$$

Whole Procedure as One Expression $$Q[i] = \begin{cases} \frac{Q_{j+1} - Q_j}{P_{scaled_{j+1}} - P_{scaled_j}} * M[i]_p + Q_j - \frac{Q_{j+1} - Q_j}{P_{scaled_{j+1}} - P_{scaled_j}} * P_{scaled_j}, & P_{scaled_j} < M[i]_p < P_{scaled_{j+1}} \\ \frac{Q_n - Q_{n-1}}{P_{scaled_n} - P_{scaled_{n-1}}} * M[i]_p + Q_n - \frac{Q_n - Q_{n-1}}{P_{scaled_n} - P_{scaled_{n-1}}} * P_{scaled_n}, & M[i]_p > P_{scaled_n} \end{cases}$$ (equation 18)

Table 1 below provides an example of pressure drops and airflows, wherein the airflows are expressed in % of nominal airflow

TABLE 1

Example data for characteristic function

| Pressure drop (Pa) | Q (% of nominal) |
|---|---|
| 1 | 1 |
| 20 | 25 |
| 40 | 50 |
| 65 | 75 |
| 90 | 100 |
| 125 | 125 |

Figure 3:
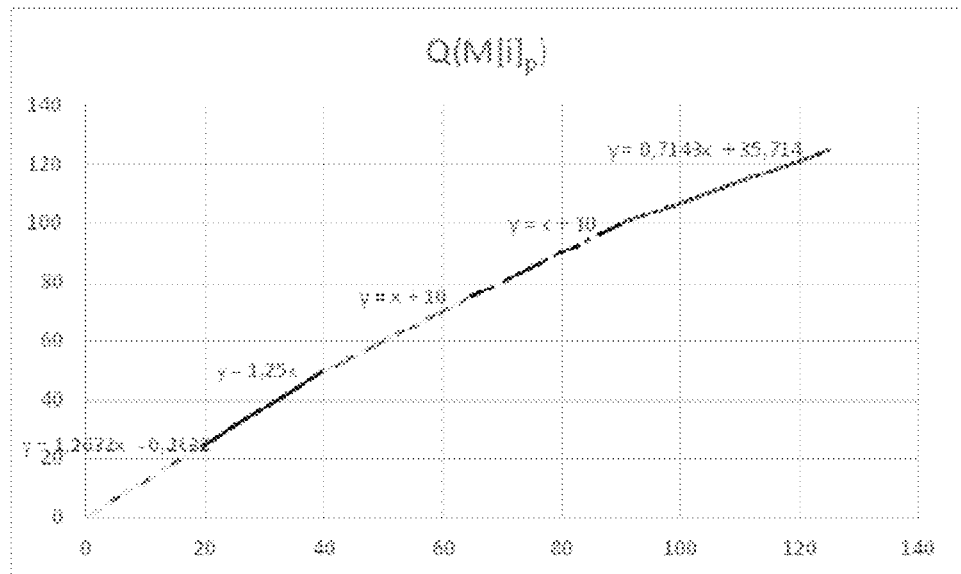
FIG. 3 is a plot of a scaled filter curve illustrating air flow Q(p) as a function of pressure drop over the filter.

FIG. 3 is a plot of a scaled filter curve illustrating air flow Q(p) as a function of pressure drop over the filter.

With a clean filter, 90 Pa is supposed to be the pressure drop at 100% flow. When the filter is running it is stuffed with catched particles, which makes the pressure drop rise. The pressure drop considered as 100% is changing and the other values for the characteristic function is scaled to fit it.

Nominal flow: 3400 m3/h
New max pressure drop (max_values[i]): 143 Pa
Pressure drop to calculate flow for (M[i]p): 66 Pa
Scale factor: 143/90=1,588889

The scaled values of Table 1 are illustrated in Table 2 below.

TABLE 2

Scaled values for the characteristic function

| Pressure drop (Pa) | Q (% of max flow) | j |
|---|---|---|
| 1,588889 | 0 | 1 |
| 31,77778 | 25 | 2 |
| 63,55556 | 50 | 3 |
| 103,2778 | 75 | 4 |
| 143 | 100 | 5 |
| 198,6111 | 125 | 6 |

Figure 4:
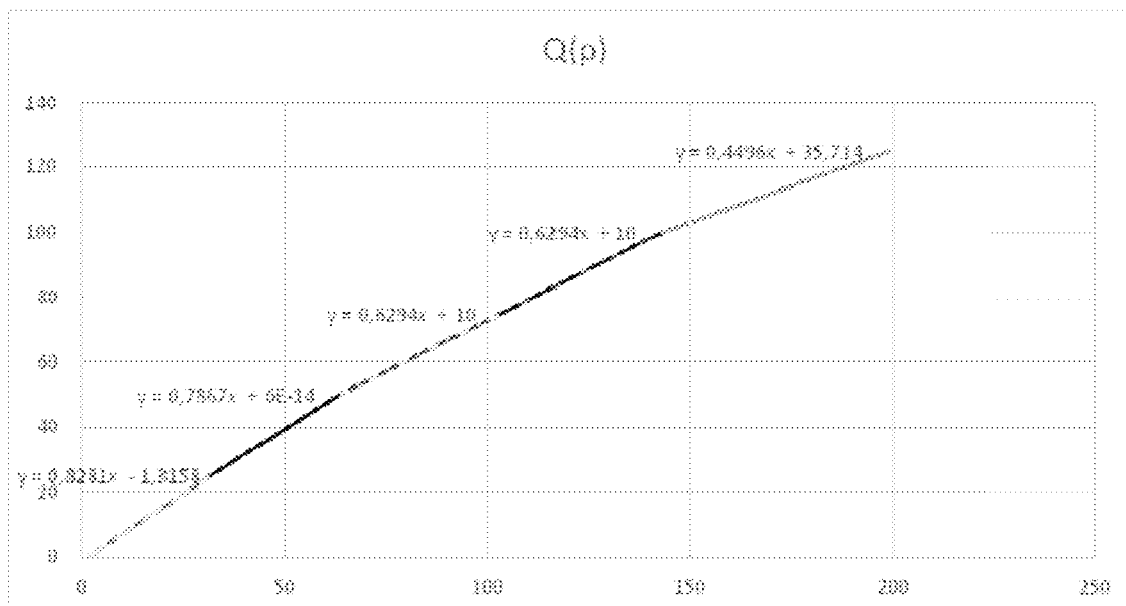
FIG. 4 is a plot of a scaled characteristic filter curve illustrating air flow Q(p) as a function of pressure drop over the filter.
Figure 5:
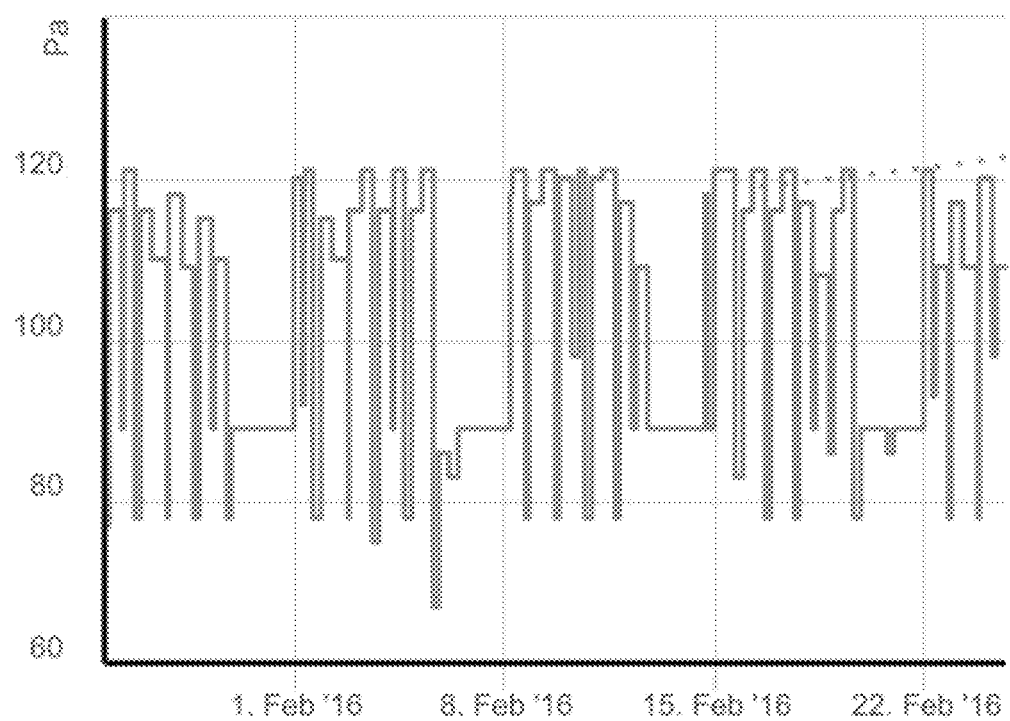
FIG. 5 illustrates measured pressure drops over time of a filter.

FIG. 4 is a plot of a scaled characteristic filter curve illustrating air flow Q(p) as a function of pressure drop over the filter.

$$63.55556 < 66 < 103.2778 \rightarrow j = 3$$ (equation 19)

$$k = \frac{75 - 50}{103.2778 - 63.55556} \approx 0.6294$$ (equation 20)

$$m = 50 - 0.6294 * 63.55556 \approx 10$$ (equation 21)

$$Q(66) = 0.6294 * 66 + 10 \approx 51.5$$ (equation 22)

The scaled Q(p) gives the flow 51.5% of nominal flow, which if the nominal flow is 3400 m3/h is calculated as 1734 m3/h.

Each measured pressure drop value and 6 months forward of predicted pressure drop values are used to calculate a one year normalized LCC for the switch interval until that point. For predicted pressure values, a mean value of Q is used.

$$E[i] = \frac{CurrentQ * M[i]_p * (M[i+1]_t - M[i]_t)}{1000 * \eta}$$ (equation 23)

$$i \leq pred_{start_{index}} \rightarrow CurrentQ = Q[i]$$

$$i > pred_{start_{index}} \rightarrow CurrentQ = \overline{Q}$$

Equation 23 provides the energy cost for the time period from $M[i]_t$ to $M[i+1]_t$ $$Energy_{annual\_cost}[i] = \sum_{k=0}^{i} E[k] * \frac{(8760 * 3600)}{M[i]_t} * Price_{kWh}$$ (equation 24)

Equation 24 provides the total annual energy consumption for switch interval $M[i]_t$ $$Filter_{annual\_cost}[i] = Price_{filter} * \frac{(8760 * 3600)}{M[i]_t}$$ (equation 25)

Equation 25 provides the total annual cost for filters for switch interval $M[i]_t$ $$Tot_{annual\_cost}[i] = Energy_{annual\_cost}[i] + Filter_{annual\_cost}[i]$$ (equation 26)

Equation 26 provides the total annual cost for the installation for switch interval $M[i]_t$ The $Tot_{annual\_cost}$ is calculated with equation 26 and then the minimum cost $Tot_{annual\_cost}[index\_of\_min]$ is identified, and from that the optimal switch interval $M[index\_of\_min]_t$ is determined.

It is recognized that in the calculations above, the fan efficiency is still set as a fixed value, but in the real world it varies due to different flows. To improve the accuracy of the algorithm this could either be calculated for each measure point by adding a specification sheet of the equipment in use or by adding a wattmeter to the fan.

The invention claimed is:
1. A method of determining an optimal filter life cycle between replacements of a filter in a ventilation system, wherein the method comprises:
using at least one pressure sensor to measure pressure change in the filter of the ventilation system, and
wherein the method further comprises performing the following steps in a processing device:
receiving at least one filter hardware value ($C_{filter}$), representing an amount of a resource associated with at least production of the filter, receiving at least one filter use value ($C_{use}$), representing an amount or rate of said resource associated with use of the filter, receiving a plurality of measured data points (M[i]) associated with the measured pressure change from the at least one pressure sensor, each representing a measured pressure drop ($M[i]_p$) over the filter at a respective time ($M[i]_t$), and determining the optimal filter life cycle by minimizing a total filter resource consumption comprising:

a first factor ($Filter_{annual\_cost}[i]$), according to which the resource consumption is inversely proportional to the filter life cycle, a second factor ($Energy_{annual\_cost}[i]$), according to which the resource consumption is directly proportional to the filter life cycle, providing a plurality of predicted data points, each representing an predicted pressure drop over the filter at a respective future point in time, grouping successive measured data points (M[i]) into windows (W), each window (W) comprising at least one of the measured data points (M[i]), for each window (W)
identifying a maximum pressure drop, and
assigning the identified maximum pressure drop as a maximum pressure drop (max_values[i]) for all measured data points (M[i]) of that window;

for each measured data point (M[i])
estimating an air flow (Q[i]) based on the maximum pressure drop (max_values[i]) and the measured pressure drop ($M[i]_p$) of the respective measured data point (M[i]), and deriving the second factor ($Energy_{annual\_cost}[i]$) based on the filter use value ($C_{use}$), the measured data points (M[i]), the predicted data points and the estimated air flows (Q[i]).

2. The method as claimed in claim 1, wherein providing a plurality of predicted data points comprises calculating a respective predicted pressure drop through the formula $P(t) = start_{Pa} * e^{b*t}$, wherein $start_{Pa}$ is a starting pressure drop of the prediction, selected from the measured pressure drops ($M[i]_p$) of the measured data points (M[i]), b is an environmental coefficient and t is the time from the time when the starting pressure drop ($start_{Pa}$) is measured until the point in time for which the pressure drop is predicted.

3. The method as claimed in claim 2, wherein the starting pressure drop ($start_{Pa}$) is a value derived based on the measured pressure drop of the latest available measured data point.

4. The method as claimed in claim 2, wherein the starting pressure drop ($start_{Pa}$) is a value derived based on the maximum pressure drop of the latest available measured data point or the latest available window.

5. The method as claimed in claim 1, wherein each window (W) comprises at least two measured data points (M[i]).

6. The method as claimed in claim 1, wherein the windows comprises a predetermined or dynamic number of measured data points (M[i]).

7. The method as claimed in claim 1, wherein the maximum pressure drop for each window (W) is determined with regard to an average value of the measure pressure drops ($M[i]_p$) of at least some of the measured data points (M[i]) of the window.

8. The method as claimed in claim 1, wherein the maximum pressure drop for each window (W) is determined with regard to a measured pressure drop ($M[i]_p$) and/or a maximum pressure drop of at least one preceding window.

9. The method as claimed in claim 1, wherein estimating the air flow for each measured data point (M[i]) comprises deriving the estimated air flow (Q[i]) of each measured data point (M[i]) based on a measured pressure drop ($M[i]_p$) of that measured data point and a characteristic function of the filter, wherein the characteristic function describes the air flow (Q) as a function of the pressure drop (P) for the filter.

10. The method as claimed in claim 9, wherein estimating the air flow for each measured data point (M[i]) comprises providing a scaling factor based on the maximum pressure drop (max_values[i]) and the measured pressure drop ($M[i]_p$) of the measured data points (M[i]), and using the scaling factor to adjust a characteristic function of the filter when it is clean.

11. The method as claimed in claim 1, further comprising predicting the air flow for at least one of the predicted data points.

12. The method as claimed in claim 11, wherein the predicted air flow of the predicted data points is a fixed value derived based on the estimated air flows (Q[i]) for at least some of the measured data points (M[i]).

13. The method as claimed in claim 11, wherein the predicted air flow of the predicted data points is a respective value derived based on at least one of the predicted data points.

14. The method as claimed in claim 1, wherein the second factor ($Energy_{annual\_cost}[i]$) is derived based on the estimated air flow (Q[i]) of each measured data point (M[i]) and/or the predicted air flow for the predicted data points.

15. The method as claimed in claim 1, wherein the second factor ($Energy_{annual\_cost}[i]$) is calculated as a sum of resource consumptions of each interval ($M[i+1]_t - M[i]_t$) between the measured data points (M[i]).

16. The method as claimed in claim 1, wherein the first factor ($Filter_{annual\_cost}[i]$) is determined as a product of the filter hardware value ($C_{filter}$), an inverse of the time ($M[i]_t$) and optionally one or more constants.

17. The method as claimed in claim 1, wherein the second factor ($Energy_{annual\_cost}[i]$) is determined as a sum of products of the filter use value ($C_{use}$), an air flow (Q[i]), a pressure drop ($M[i]_p$), a time interval ($M[i+1]_t - M[i]_t$), an inverse of a fan efficiency ($\eta$), an inverse of a time ($M[i]_t$), and/or one or more constants.

18. The method as claimed in claim 1, wherein the second factor ($Energy_{annual\_cost}[i]$) is determined according to the formula $$Energy_{annual\_cost}[i] = \sum_{k=0}^{i} E[k] * \frac{(8760 * 3600)}{M[i]_t} * Price_{kWh}$$

wherein $Price_{kWh}$ is the energy cost per kilowatt hour, $M[i]_t$ is the respective point in time and $$E[i] = \frac{CurrentQ * M[i]_p * (M[i+1]_t - M[i]_t)}{1000 * \eta}$$

$i \leq pred_{start_{index}} \rightarrow CurrentQ = Q[i]$ $i > pred_{start_{index}} \rightarrow CurrentQ = \overline{Q}$ wherein M[i]p is the pressure drop, M[i+1]$_t$–M[i]$_t$ is the time interval between measure data points M[i+1] and M[i], η is the fan efficiency and CurrentQ is the estimated air flow (Q[i]) of the measured data point (M[i]) or the average of at least some of the estimated air flows (Q[i]).

19. The method as claimed in claim 1, wherein the optimal life cycle is determined by minimizing the formula $$Tot_{annual\_cost}[i] = Energy_{annual\_cost}[i] + Filter_{annual\_cost}[i]$$

with respect to the time (M[i]$_t$).

20. A system for monitoring a filter in a ventilation system, comprising:
at least one pressure sensor configured to measure pressure change in the filter of the ventilation system; and
a processing device configured to:
receive a filter hardware value, representing an amount of a resource associated with at least production of the filter,
receive a filter use value, representing an amount of said resource associated with use of the filter,
determine a pressure drop over the filter during use of the ventilation system based on the measured pressure change from the at least one pressure sensor,
receive at least one filter hardware value ($C_{filter}$), representing an amount of a resource associated with at least production of the filter,
receive at least one filter use value ($C_{use}$), representing an amount or rate of said resource associated with use of the filter,
receive a plurality of measured data points (M[i]), each representing a measured pressure drop (M[i]$_p$) over the filter at a respective time (M[i]$_t$), and
determine the optimal filter life cycle by minimizing a total filter resource consumption comprising:
a first factor (Filter$_{annual\_cost}$[i]), according to which the resource consumption is inversely proportional to the filter life cycle,
a second factor (Energy$_{annual\_cost}$[I]), according to which the resource consumption is directly proportional to the filter life cycle,
provide a plurality of predicted data points, each representing an predicted pressure drop over the filter at a respective future point in time,
group successive measured data points (M[i]) into windows (W), each window (W) comprising at least one of the measured data points (M[i]),
for each window (W)
identify a maximum pressure drop, and
assign the identified maximum pressure drop as a maximum pressure drop (max_values[i]) for all measured data points (M[i]) of that window;
for each measured data point (M[i])
estimate an air flow (Q[i]) based on the maximum pressure drop (max_values[i]) and the measured pressure drop (M[i]$_p$) of the respective measured data point (M[i]), and
derive the second factor (Energy$_{annual\_cost}$[i]) based on the filter use value ($C_{use}$), the measured data points (M[i]), the predicted data points and the estimated air flows (Q[i]).

* * * * *